United States Patent [19]

Desvaux

[11] Patent Number: 5,357,417
[45] Date of Patent: Oct. 18, 1994

[54] DISTURBANCE-LIMITING CIRCUIT OF REDUNDANT TYPE FOR REGULATION EQUIPMENT

[75] Inventor: Jean-Pierre Desvaux, Ablon sur Seine, France

[73] Assignee: Cegelec, Lavallois Perret, France

[21] Appl. No.: 904,144

[22] Filed: Jun. 25, 1992

[30] Foreign Application Priority Data

Jun. 25, 1991 [FR] France .................. 91 07789

[51] Int. Cl.$^5$ .................................................. H02J 1/14
[52] U.S. Cl. .................................. 363/71; 361/18; 361/111
[58] Field of Search .................. 363/65, 71, 52–58; 361/18, 90, 91, 92, 111; 307/30–32, 38, 39, 43–45, 51–53, 58

[56] References Cited

U.S. PATENT DOCUMENTS

| | | |
|---|---|---|
| 4,644,498 | 2/1987 | Bedard et al. .................. 307/219 X |
| 4,729,086 | 3/1988 | Lethellier ........................ 363/71 X |
| 4,860,188 | 8/1989 | Bailey et al. ....................... 363/65 |
| 5,027,002 | 6/1991 | Thorton .......................... 307/219 X |
| 5,031,180 | 7/1991 | McIver et al. . |
| 5,122,726 | 6/1992 | Elliott et al. ..................... 363/56 X |

FOREIGN PATENT DOCUMENTS

| | | |
|---|---|---|
| 2151162 | 4/1973 | Fed. Rep. of Germany . |
| 2502710 | 7/1976 | Fed. Rep. of Germany . |
| 3031438 | 3/1982 | Fed. Rep. of Germany . |

*Primary Examiner*—Emanuel T. Voeltz
*Attorney, Agent, or Firm*—Sughrue, Mion, Zinn, Macpeak & Seas

[57] ABSTRACT

A disturbance-limiting circuit for regulation equipment connected to an actuator controlling a process in which the actuator is controlled from a reference generator unit (1) via a plurality of regulator modules (3A, 3B, ..., 3N) having their outputs connected to a common point (UP) so that the control value provided to the actuator at said point corresponds to the mean value of the respectively-provided voltages. The circuit is constituted by a voting circuit comprising modules (4A, 4B, ..., 4N) each inserted between the output of one of the regulator modules and a corresponding respective resistor (RA, RB, ..., RN), connected to the common point (UP). Each voting module includes an impedance adapter (7A) having its input connected to a regulator module and having its output connected to the corresponding respective resistor, said output is also connected via a resistor (9A) firstly to the input of the adapter via a clipping circuit (8A) and secondly to a point (UR) common to all of the adapters of the voting circuit.

3 Claims, 2 Drawing Sheets

DISTURBANCE-LIMITING CIRCUIT OF REDUNDANT TYPE FOR REGULATION EQUIPMENT

BACKGROUND OF THE INVENTION

The invention relates to a disturbance-limiting circuit of redundant type for regulation equipment.

In the field of regulation, it is well known to use a plurality of redundant paths to control a process, e.g. to provide regulated control for a steam turbine, on the basis of a reference value and via a circuit made up of identical regulator modules disposed in parallel.

The resulting control value applied to the process conventionally corresponds to a mean value obtained from the regulated values provided simultaneously by the regulator modules, which modules may be of the proportional and integral type, for example.

In a conventional implementation using analog technology, the control value is a mean voltage value obtained from the voltages respectively delivered by each of the regulator modules, with the voltage outputs from each of them being connected for this purpose to a common point via respective same-value resistances.

In the event of a failure concerning one of the paths, the voltage delivered by the module contained in said path is generally either zero or a maximum, and this gives rise to an unacceptable amount of variation in the applied control value, for example, if the apparatus has three paths this variation may reach 33%.

SUMMARY OF THE INVENTION

To remedy this drawback, the present invention therefore provides a disturbance-limiting circuit of redundant type for the regulation equipment of an actuator in a process control system where said actuator is controlled from a reference-generating unit and via a plurality of regulator modules preferably of the proportional and integral type, each providing a control signal in the form of a voltage and being connected to the actuator at a common point via a respective same-resistance resistor so that the control value delivered to the actuator is the mean value of the voltages respectively supplied by said regulator modules, as a function of the reference that is applied thereto and as a function of a measurement representative of the effect produced by the actuator on the process.

According to a characteristic of the invention, the disturbance-limiting circuit is constituted by a voting circuit made up of modules, each inserted between the output of one of the regulator modules and the corresponding respective resistor connected to a common point and via which the actuator is controlled, each voting module including an impedance adapter connected via a high impedance input to the output of a regulator module and via an output to the corresponding respective resistor, said adapter output being connected via a "downstream" resistor in a loop to the input of said adapter via a clipping circuit, and secondly to a point common to all of the adapters in the voting circuit.

BRIEF DESCRIPTION OF THE DRAWINGS

The invention, its characteristics, and its advantages are described in greater detail below with reference to the following figures.

DETAILED DESCRIPTION OF THE EMBODIMENTS

Figure 1:
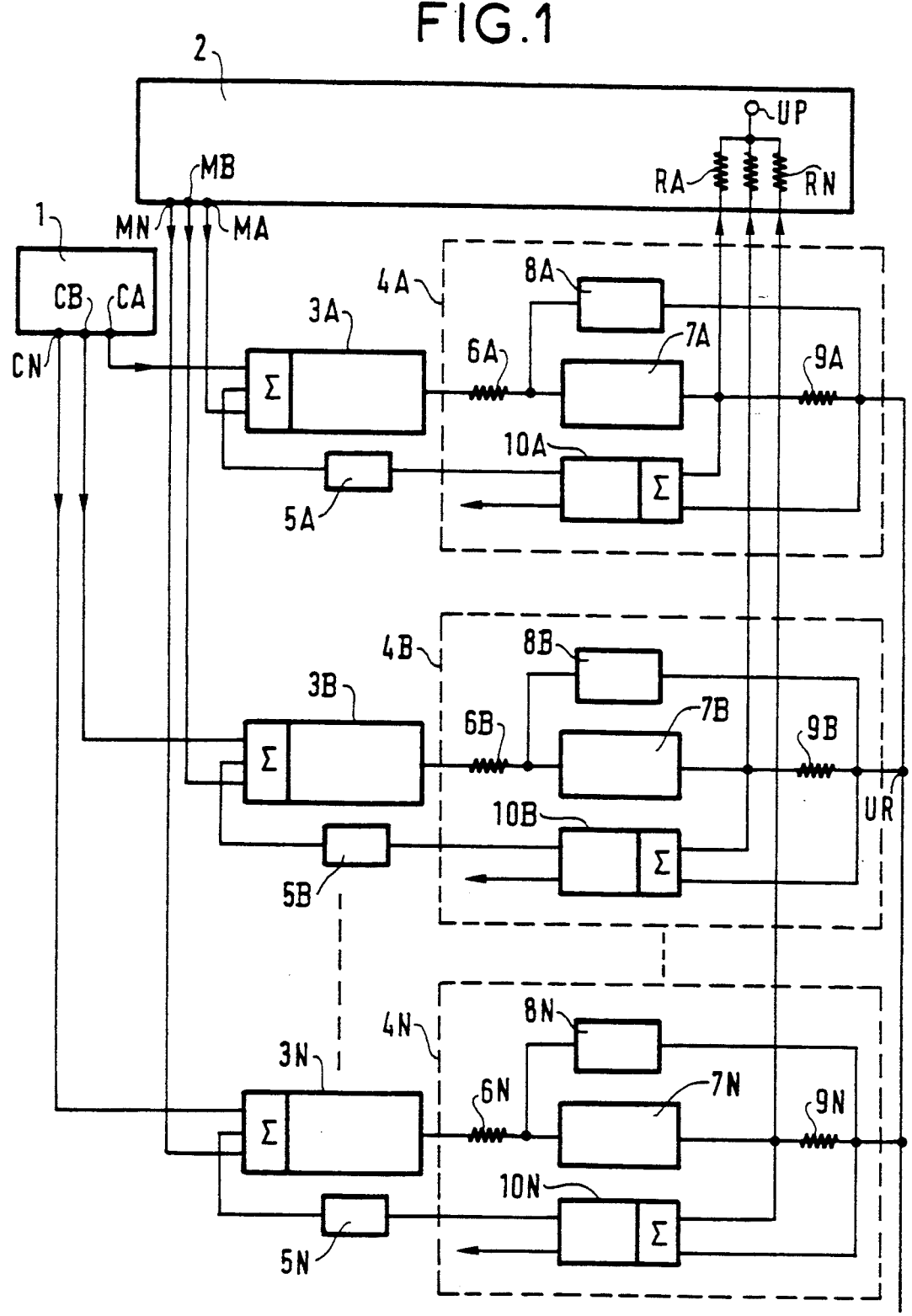
FIG. 1 is a block diagram of a process control system in which the regulation equipment includes a disturbance-limiting circuit of the invention.

The process control system outlined in FIG. 1 is provided to control a steam turbine, for example, and it comprises, in particular, a unit 1 suitable for providing a reference value such as a speed reference for use in controlling an actuator that controls the process, e.g. a positioner for a steam admission valve in the example described. This actuator is not shown and comprises one of the items in an assembly 2 representing the turbine and its control and monitoring environment.

The above-mentioned control actuator receives an electrical control signal generated by the regulation equipment which comprises n identical parallel paths, where the number n is selected to be not less than three.

Each path comprises a regulator module referenced 3A, 3B, . . . , 3N, which is associated with a voting module referenced 4A, 4B, . . . , 4N, with only three paths being considered and shown in the present case.

As mentioned above, the electrical control signal delivered to the control actuator corresponds to the mean value of the signals provided by the n paths, which mean value is conventionally obtained at a point referenced UP which is common to n resistors referenced RA to RN, each connected to the output of a respective different path.

In conventional manner, the assembly 2 returns at least one measurement value to each of the regulator modules, said measurement being representative of the effect produced by the control actuator on the process, i.e. on the turbine in the application described.

In this case, these measurements are assumed to be delivered in the form of a voltage on outputs referenced MA, MB, . . . , MN of the assembly 2.

Each regulator module 3A, 3B, . . . , 3N is connected via a first input to a corresponding output CA, CB, . . . , CN of the unit 1 to receive the reference value and via a second input to one of the outputs MA, MB, . . . , MN of the assembly 2 to receive a measurement.

The voltages corresponding to said reference and to said measurement are processed in the regulator module receiving them to produce one of the n control voltages from which the control value delivered to the corresponding actuator is derived.

The control voltage produced respectively by the regulator module 3A, 3B, . . . , 3N of any one path is applied to the input of the voting module 4A, 4B, . . . , 4N that follows it in said path and which is suitable for returning thereto a limited representation of the correction applied to a third input via an offset corrector 5A, 5B, . . . , 5N.

The n voting modules of the disturbance-limiting circuit of the invention are associated with one another in such a manner as to limit the variation of the control value in the event of a fault by clipping each of the n outputs on the basis of the mean value of said n outputs.

The disturbance-limiting circuit is thus constituted by a voting circuit having n modules.

Each voting module essentially comprises an input resistor A, 6B, . . . , 6N of high resistance, e.g. 200 k.ohms, an impedance adapter 7A, 7B, . . . , 7N, corrected to the output of a regulator module via the input resistor, a clipping circuit 8A, 8B, ..., 8N connected between the output and the input of the impedance adapter of the voting module that contains it, and a low resistance downstream resistor 9A, 9B, ..., 9N, e.g. having a resistance of about 300 ohms, connected to the output of the impedance adapter, upstream from the point where the clipping circuit of the module is connected.

The n impedance adapters are connected firstly to the point UP of the assembly 2 via respective ones of the resistors RA, RB, ..., RN to generate the control value, and also to a point UR common to the downstream resistors, each via its own downstream resistor.

The n clipping circuits are also all directly connected to the common point UR.

In the absence of a fault on any of the paths, the output voltage obtained from each impedance adapter is identical to the voltage present on its input.

Otherwise, the voting circuit limits the influence of the disturbance because of the effect of the clipping circuits, each of which limits the maximum output voltage from the corresponding impedance adapter to the mean value of the n output voltages that are simultaneously present.

The impedance adapters thus provide current amplification of said mean value.

When the number n is three, then a disturbing variation is limited to 4% at the output from the regulators in the event of a sudden failure, and the disturbance will only be momentary if the regulators are of the type mentioned above.

In the example shown, each voting module includes an error detector 10A, 10B, ..., 10N whose input is constituted by a comparator having one input connected to the output of the impedance adapter of the module and having another input connected to the downstream resistor of said voting module.

Each error detector is connected to the input of the offset corrector 5A, 5B, ..., 5N of the module to correct small amounts of drift or error in the regulator modules, thus ensuring that the regulator modules operate identically and thus ensuring that the voting modules operate identically without giving precedence to any one path over the others in normal operation.

A fault-indicating signal is also delivered by each error detector in the event of a critical variation in the corresponding path.

In the implementation described, it should be observed that the failure of an impedance adapter may give rise to a variation whose amplitude is similar to the variation that was previously possible.

Figure 2:
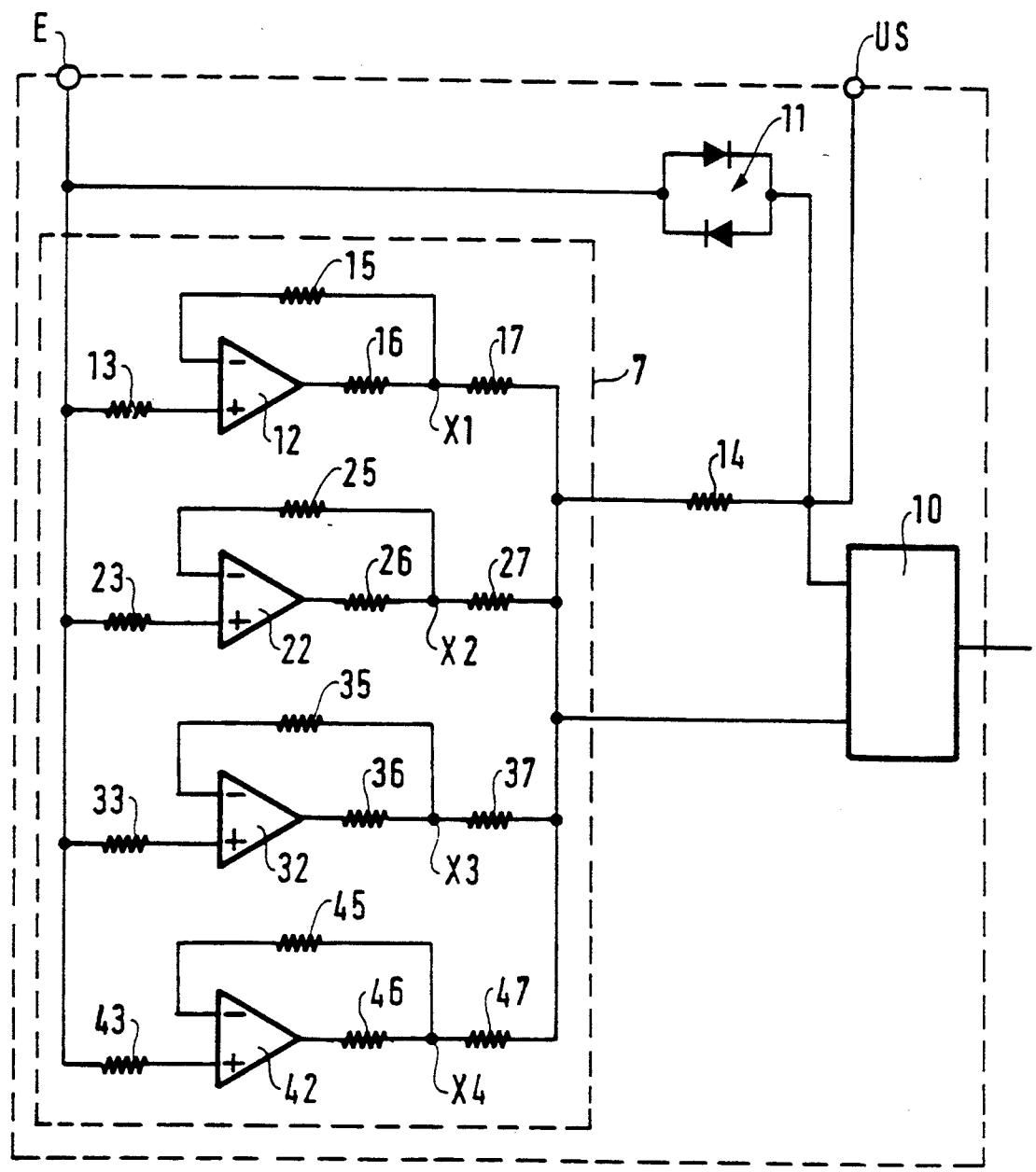
FIG. 2 shows an embodiment of an impedance adapter for the disturbance-limiting circuit of the invention.

Unfortunately, this item is the most fragile part of the voting module, given that the clipping circuit is conventionally constituted by two diodes connected head to tail, such as the diodes 11 in FIG. 2, and that it is required only to convey currents that are very low.

In its most rudimentary form, such an impedance adapter comprises only one operational amplifier 12 whose non-inverting input receives the output signal from a regulator module via a high value input impedance referenced 13 and connected to an input E, as described with reference to FIG. 1. The amplifier 12 has a feedback loop connected to its inverting input to set the gain of its output voltage.

In a preferred embodiment as shown in FIG. 2, an impedance adapter of a voting module includes four operational amplifiers referenced 12, 22, 32, and 42 for compensating one another in the event of any one of them failing.

To this end, these operational amplifiers have their respective non-inverting inputs connected in common to the input E of the impedance adapter via a respective high resistance input resistor referenced 13, 23, 33, or 43, as already described.

The output of each of these amplifiers is connected to the output of the other amplifiers to provide common feed to the downstream resistor (here referenced 14) of the voting module in which they are contained, and consequently to feed the diode clipping circuit 11; the output terminal referenced US via which the module is connected to one of the resistors RA, RB, ..., RN of the assembly 2; and finally one of the two inputs of the associated error detector 10.

Low resistance protection resistors are also included in the circuits, in particular in each feedback loop, such as the resistors 15, 25, 35, and 45 between the output of each operational amplifier and a corresponding connection point X1 to X4 in the feedback loop, such as the resistors 16, 26, 36, and 46 between each connection point X1 to X4 and the downstream resistor to which it is connected, and also the corresponding other connection points of the impedance adapter under consideration, such as the resistors 17, 27, 37, and 47.

I claim:

1. In a disturbance-limiting circuit for use in a regulation apparatus for an actuator controlled from a reference-generating unit via a plurality of regulator modules each of said regulator modules providing a control signal in the form of a voltage and being connected to the actuator at a common point via a respective resistor so that the control valued delivered to the actuator is a mean value of the voltages respectively supplied by said regulator modules, the improvement comprising a plurality of voting circuits respectively inserted between an output of a respective one of the regulator modules and the corresponding respective resistor connected to the common point; each voting module including an impedance adapter connected via a high impedance input to the output of the respective regulator module and at an output of the corresponding respective resistor, said adapter output further being connected to a downstream resistor constituting part of a loop to the input of said adapter, a clipping circuit connected in said loop, said loop being further connected, at a point between said downstream resistor and said clipping circuit, in common to loops of each of said voting modules.

2. A disturbance-limiting circuit according to claim 1, wherein each voting module further includes an error detector having inputs connected to respective ends of said downstream resistor of said module, and an output connected via an offset corrector to a correction input of the regulator module to which the voting module is connected.

3. A disturbance-limiting circuit according to claim 1, wherein each said impedance adapter comprises a plurality of identical units connected in parallel, each unit including an operational amplifier having a high impedance input and a feedback loop, each connection to said amplifier being provided with protection resistors.

* * * * *